United States Patent
Petculescu et al.

(10) Patent No.: US 6,473,764 B1
(45) Date of Patent: Oct. 29, 2002

(54) VIRTUAL DIMENSIONS IN DATABASES AND METHOD THEREFOR

(75) Inventors: Cristian Petculescu, Redmond; Amir Netz, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/418,807

(22) Filed: Oct. 15, 1999

(51) Int. Cl.[7] .............................................. G06F 17/30
(52) U.S. Cl. ...................................... 707/102; 707/200
(58) Field of Search ................................. 707/102, 1, 2, 707/3, 4, 100, 200

(56) References Cited

U.S. PATENT DOCUMENTS 5,978,796 A * 11/1999 Malloy et al. ................. 707/3
6,122,636 A * 9/2000 Malloy et al. ............... 707/102
6,205,447 B1 * 3/2001 Malloy ........................ 707/102

* cited by examiner

Primary Examiner—Diane D. Mizrahi
(74) Attorney, Agent, or Firm—Woodcock Washburn LLP

(57) ABSTRACT

A method, apparatus, and software are disclosed for analyzing the data in an OLAP or other type of database. The data is analyzed as if it were indexed by desired dimensions without actually creating the dimensions. Relations known as virtual dimensions are defined in relation to existing base dimensions in the database rather than in relation to the underlying detailed data. Functions operating on these virtual dimensions are translated into functions that operate on the existing base dimensions. As a result, the need to perform certain precalculations is avoided, thereby promoting efficient use of computing resources.

20 Claims, 3 Drawing Sheets

VIRTUAL DIMENSIONS IN DATABASES AND METHOD THEREFOR

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©1999, Microsoft, Inc.

TECHNICAL FIELD OF THE INVENTION

The present invention pertains generally to computer-implemented databases, and more particularly to summaries of data contained in such databases.

BACKGROUND OF THE INVENTION

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

A fundamental entity that is present in typical OLAP databases is a cube. A cube is a multidimensional representation of a set of data having varying aspects. A cube comprises a set of dimensions and a set of measures. In this context, a dimension is a structural attribute of the cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array.

A measure is a structural attribute of the cube that comprises a particular type of value that provides detail data for particular members within the dimensions. For example, sale amounts and units sold can be measures of a retail cube having a time dimension and a geography dimension. The measures provide the sale amounts and units sold for a particular geographic region at a particular point in time.

Databases are commonly queried for summaries of data rather than individual data items. For example, a user might want to know sales data for a given period of time without regard to geographical distinctions. These types of queries are efficiently answered through the use of data tools known as aggregations. Aggregations are precomputed summaries of selected data that allow an OLAP system or a relational database to respond quickly to queries by avoiding collecting and aggregating detailed data during query execution. Without aggregations, the system would need to use the detailed data to answer these queries, resulting in potentially substantial processing delays. With aggregations, the system computes and materializes aggregations ahead of time so that when the query is submitted to the system, the appropriate summary already exists and can be sent to the user much more quickly.

Data in an OLAP system can be characterized in terms of its complexity, that is, the number of dimensions used to index the data. Thus, a complex data set is one that has many dimensions. Complex data sets have the advantage of flexibility in that users can submit more possible queries to complex data sets than to simple data sets. Accordingly, it is often desirable to use complex data sets. Increasing the complexity of a data set, however, also increases the number of pre-calculations that are required in order to maintain good performance. This is because more aggregations must be calculated ahead of time to answer the increased number of possible queries.

Because the number of required pre-calculations increases exponentially with increases in the number of dimensions, it is difficult to handle a large number of dimensions using conventional OLAP systems. Generally, conventional approaches involve striking a balance between flexibility and use of computing resources.

SUMMARY OF THE INVENTION

According to various example implementations of the invention, there is provided an efficient system for analyzing data as if the data were indexed by desired dimensions without actually creating the dimensions. These dimensions, known as virtual dimensions, are defined in relation to existing base dimensions rather than in relation to the underlying detailed data, thereby avoiding the need to perform the precalculations normally associated with creating a dimension. Significant computing effort is conserved as a result.

In one particular method implementation, a selected property value of each of a set of base dimension members is associated with a corresponding base dimension member. A set of distinct property values is determined for the set of base dimension members. For each distinct property value, an aggregate of the base dimension members that have that distinct property value is computed.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
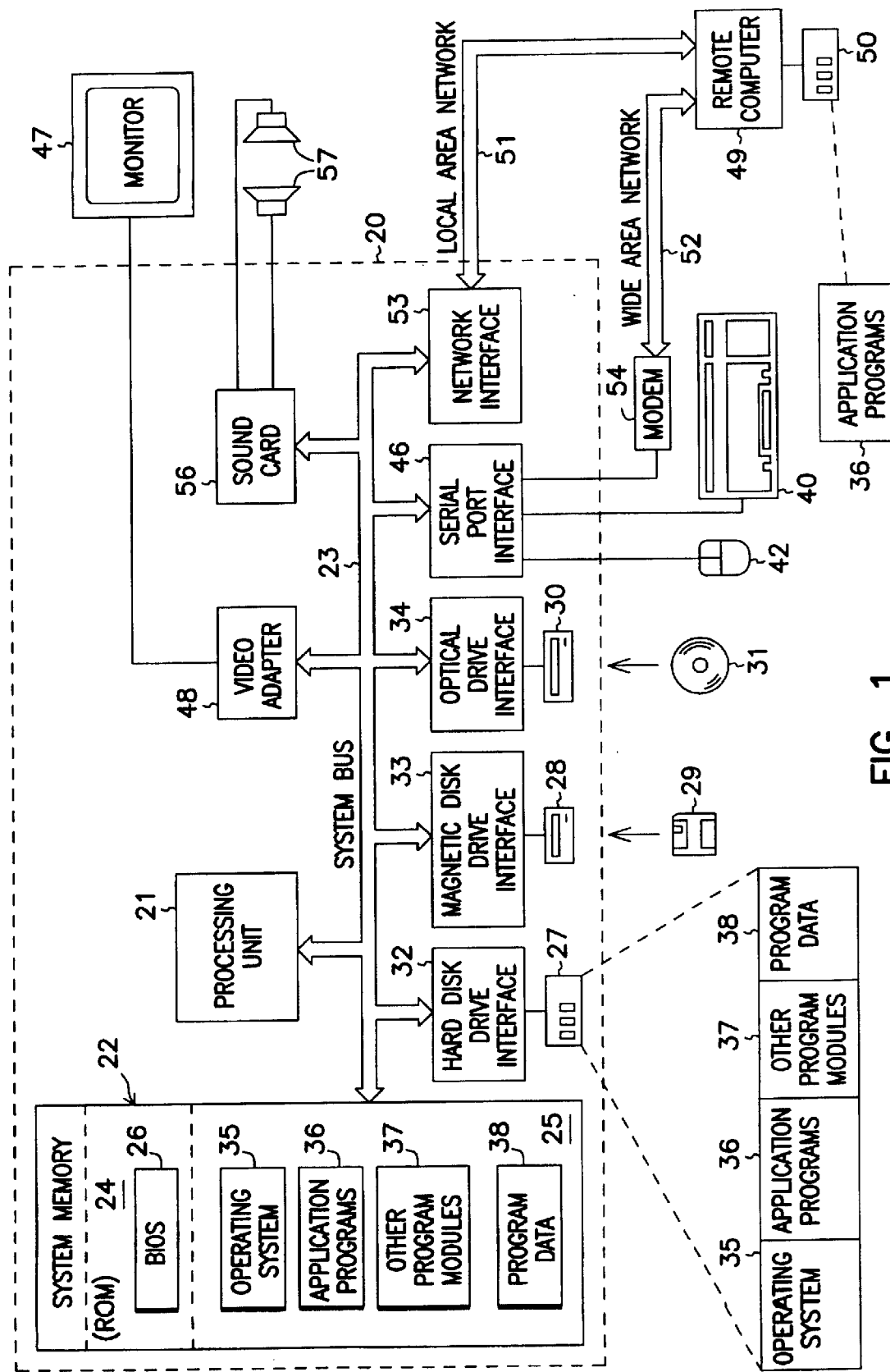
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including objectoriented programming methods. C++ and Java are two examples of common objectoriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments of the Invention

Figure 2:
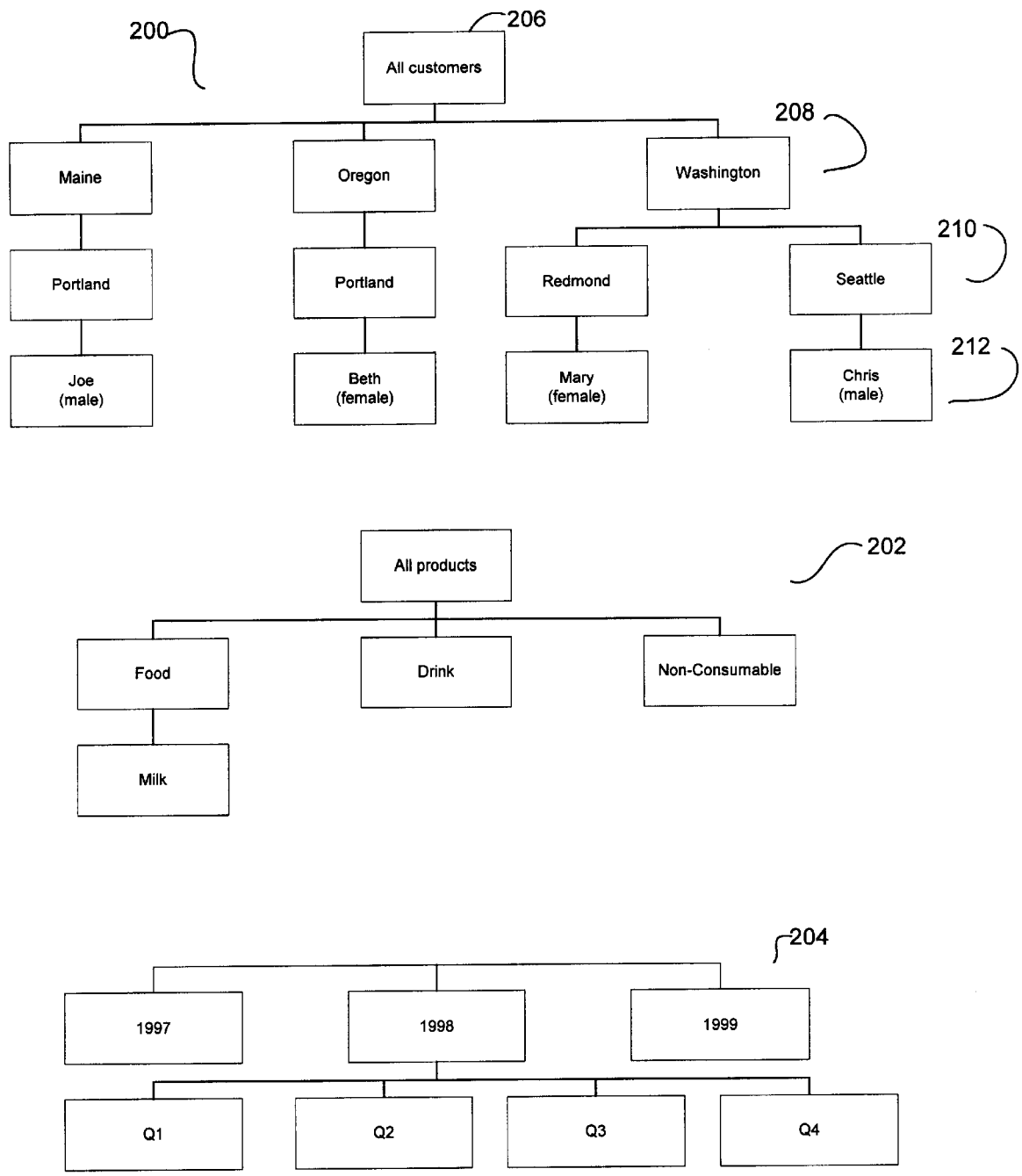
FIG. 2 conceptually illustrates three example dimensions in a multidimensional data cube.

According to one example embodiment of the present invention, relations known as virtual dimensions are defined in relation to existing base dimensions in an OLAP or other type of database. Base dimensions are defined in relation to the underlying detailed data. FIG. 2 conceptually depicts three example base dimensions in a multidimensional data cube. It should be noted that, while the data in this example is described as being organized in a data cube, the term "cube" is not to be construed to require a three-dimensional structure. On the contrary, the data cube may contain more than three dimensions. In FIG. 2, a customers dimension 200, a products dimension 202, and a time dimension 204 are shown. Because each of these dimensions is represented in the detailed data, each is a base dimension. For purposes of this discussion, the customers dimension 200 is of particular interest. As depicted in FIG. 2, the customers dimension 200 contains an all customers level 206, a regional level 208, a city level 210, and an individual customer level 212. Each of these levels represents a different level of specificity in aggregating the detailed data.

By contrast, virtual dimensions are defined in relation to other dimensions and have no representation in the detailed data. Virtual dimensions use properties of members of the base dimensions as well as precalculations involving the base dimensions to avoid the need to create dedicated data and precalculations for the virtual dimensions. Accordingly, virtual dimensions can be added to a data cube without increasing its complexity and without requiring additional precalculations. Moreover, virtual dimensions can be added without changing the structure of the data cube. As a result, changing the dimensionality of the data cube does not require reloading all of the data into the data cube.

Virtual dimensions can be operated upon in much the same manner as conventional dimensions. For example, users can summarize and aggregate data according to virtual dimensions in the same way as with base dimensions, using similar commands and/or interfaces. Functions operating on these virtual dimensions are internally translated into functions that operate on the base dimensions. Thus, virtual dimensions are handled invisibly to the user. While virtual dimensions may be evaluated somewhat more slowly than base dimensions, they allow the user to extend the richness of data analysis dramatically with very little cost.

According to a particular implementation, virtual dimensions are defined based on properties, or attributes, of base dimensions, also known as key dimensions. These properties are typically manifested as columns in the dimension table and are usually represented as properties of the base dimension members of the base dimension. For example, in a database of sales data having the structure depicted in FIG. 2, one of the base dimensions is the customers dimension 200, which has the individual customer level 212. Each customer member of this individual customer level 212 has certain attributes or properties, including, for example, a name, gender, education level, address, wealth, and age. By way of illustration, the members of the individual customer level 212 are shown as being associated with one of two genders, male and female. Virtual dimensions can be defined in relation to any of these properties. As a particular operational example, a "customers' gender" virtual dimension can be defined according to the gender property of the individual customer level 212. In this example, the gender property is denoted as the source property of the "customers' gender" virtual dimension because it is the property by which the virtual dimension is defined.

As previously discussed, base dimensions consist of members that are defined in relation to and are represented in the detailed data. By contrast, virtual dimensions are not truly dimensions at all. Instead, they are aggregations of filtered, or selected, members of base dimensions. For example, the "male" member of the "customers' gender" virtual dimension is not itself represented in the detailed data, as is the case with true members of base dimensions. Instead, the "male" member is defined as the aggregate of the members of the individual customer level 212 that have a gender property of "male."

Figure 3:
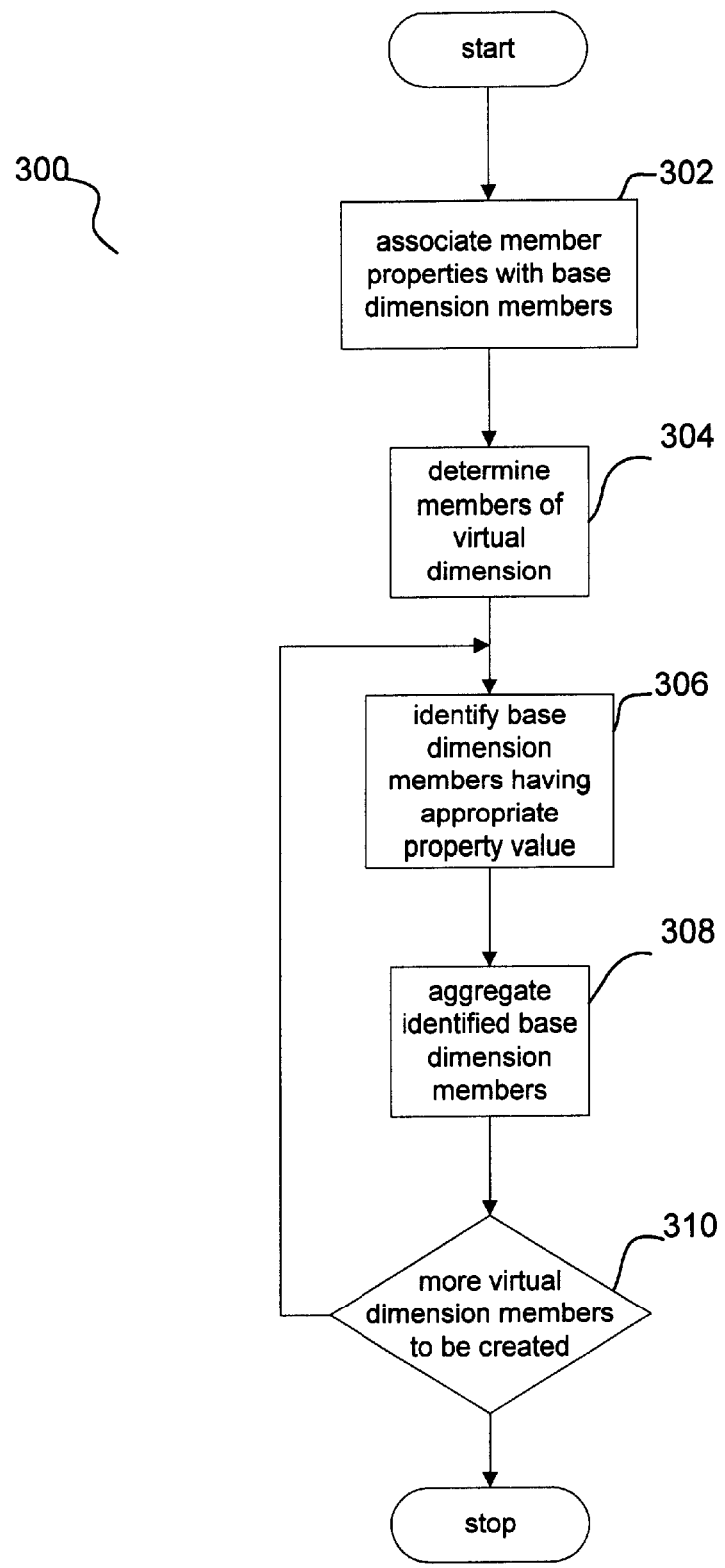
FIG. 3 is a flowchart depicting an example method for implementing virtual dimensions in a database system, according to still another embodiment of the present invention.

FIG. 3 depicts an example method 300 for creating a virtual dimension, according to one particular embodiment of the present invention. First, when the database system creates the base dimension members hierarchy, the database system reads the member properties and associates them with the dimension members, as depicted at a block 302. Thus, in the above example, when the database system creates the hierarchy of individual customers, it reads the gender property of each individual customer and associates each customer with a gender. The base dimension members hierarchy can be read either all in advance or on a demand basis.

After the member properties and dimension members are properly associated, flow proceeds to a block 304, at which the members of the virtual dimension are determined based on the values of the source properties of the base dimension members. The number of members in the virtual dimension is the number of distinct property values that are found in the base dimension members. Turning again to the above operational example, the two distinct property values for the "Gender" property are "male" and "female." Thus, the "customers' gender" virtual dimension has two members. A variety of techniques can be used to determine the distinct property values in the base dimension members. For instance, the property values of all members of the base dimension can be scanned. In an alternative embodiment, the source database is queried for all of the distinct property values in advance. As still another alternative, a list of distinct property values can be maintained in the OLAP system memory.

The virtual dimension members can be created in advance or deferred until the user tries to use the virtual dimension. The virtual dimension members are derived members, also known as calculated members, because their values are derived by calculating the values of other dimension members.

Specifically, each of the dimension members in the virtual dimension, e.g., "male" and "female", is computed as the aggregate of all of the members of the base dimension (in this example, customers) that have a specific property value. For example, the "male" member of the virtual dimension is computed as the aggregate of all of the customers having a gender property of "male." To compute the values of the dimension members in the virtual dimension, the base dimension members having the appropriate property value (e.g., "male") are identified, as depicted at a block 306. In a particular embodiment, the base dimension members are identified by using an expression in a multidimensional query language, such as MDX, to select or filter the base dimension members that have the property value in question. Such an MDX expression has the form of, e.g.:

Aggregate(
  Filter(
    Descendants(<base dimension>.CurrentMember,
      <property's base dimension level>),
    <base dimension>.CurrentMember.Properties
      (<source property>)=<specific value>)))

where
  <base dimension>denotes the dimension containing the source members of the virtual dimension,
  <property's base dimension level>denotes the level in the base dimension that contains the members that have the source property,
  <source property>denotes the name of the property that is the basis for the virtual dimension, and
  <specific value>denotes the specific value of the property that corresponds to the dimension member.

Thus, in the operational example, for the "male" member of the virtual dimension, the MDX expression might have the form:

Aggregate(
  Filter(
    Descendants([Customers].CurrentMember,
      [Individual Customers]),
    [Customers].CurrentMember.Properties("Gender")=
      "Male")))

This MDX expression aggregates the values for only male customers, ignoring female customers. To generate the "female" member of the virtual dimension, the MDX expression has a similar form, but substitutes "Female" for "Male."

After the appropriate base dimension members have been identified in connection with the block 306, the identified base dimension members are aggregated to create the member of the virtual dimension member. This process is depicted at a block 308. If an MDX expression is used to filter the base dimension members having the gender property value "male," for example, aggregation is performed by processing the MDX expression generated in connection with the block 306.

Next, at a decision block 310, the system determines whether any other members need to be created in the virtual dimension. In particular, the system determines whether any other distinct property values exist for which members in the virtual dimension have not yet been created. If any exist, flow returns to the block 306, and an MDX expression is created and evaluated for another distinct property value. This process is repeated until all of the distinct property values have been accounted for. Thus, the system automatically creates a member for each distinct property value, as well as the MDX expression for generating each member of the virtual dimension.

As an alternative, instead of generating the MDX expressions for creating the members of the virtual dimensions, the system can be hard-coded to scan all of the members. This implementation is particularly desirable if the particular virtual dimensions needed are not likely to change.

As another alternative, the system optionally prepares sets of members that have common property values in advance, thereby obviating the need to filter the base dimension members according to particular property values. For example, in a particular implementation, the customers might be separated into male and female groups in advance. In such an implementation, it is not necessary to use MDX expressions to separate the male customers from the female customers.

It can be seen that virtual dimensions significantly and advantageously extend the flexibility of OLAP and other types of database systems by allowing users to group data in ways other than those allowed by the base dimensions. By avoiding creating additional base dimensions, the number of precalculations involved is reduced, promoting efficient use of computing resources. This process is performed in a manner invisible to the user, such that the user can work with the virtual dimension as if it were a base dimension.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for analyzing data in a database, the method comprising:
  associating a selected property value of each one of a set of base dimension members with a corresponding one of the set of base dimension members;
  determining a set of distinct property values for the set of base dimension members; and
  for each distinct property value, computing an aggregate of the base dimension members that have that distinct property value.

2. The method, according to claim 1, wherein associating a selected property value of each one of the set of base dimension members with a corresponding one of the set of base dimension members is performed when a base dimension members hierarchy is created.

3. The method, according to claim 2, further comprising reading the base dimension members hierarchy before associating a selected property value of each one of the set of base dimension members with a corresponding one of the set of base dimension members.

4. The method, according to claim 2, further comprising reading the base dimension members hierarchy on a demand basis.

5. The method, according to claim 1, wherein determining the set of distinct property values for the set of base dimension members comprises scanning the property values of all of the base dimension members.

6. The method, according to claim 1, wherein determining the set of distinct property values for the set of base dimension members comprises querying the database for the set of distinct property values.

7. The method, according to claim 1, wherein determining the set of distinct property values for the set of base dimension members comprises maintaining a list of distinct property values in a memory.

8. The method, according to claim 1, wherein computing the aggregates is performed before a user request to analyze the data.

9. The method, according to claim 1, wherein computing the aggregates is performed on a demand basis.

10. The method, according to claim 1, wherein computing the aggregate of the base dimension members that have a distinct property value comprises creating a multidimensional expression language (MDX) expression as a function of that distinct property value.

11. The method, according to claim 1, wherein computing the aggregate of the base dimension members that have a distinct property value comprises referencing a predefined set of instructions for computing the aggregate.

12. The method, according to claim 1, wherein computing the aggregates comprises sorting the base dimension members into subsets according to their property values.

13. A computer-readable medium for analyzing data in a database, the computer-readable medium having computer-executable instructions for:

associating a selected property value of each one of a set of base dimension members with a corresponding one of the set of base dimension members;

determining a set of distinct property values for the set of base dimension members; and for each distinct property value, computing an aggregate of the base dimension members that have that distinct property value.

14. The computer-readable medium, according to claim 13, having further computer-executable instructions for computing the aggregate of the base dimension members that have a distinct property value at least in part by creating a multidimensional expression language (MDX) expression as a function of that distinct property value.

15. The computer-readable medium, according to claim 13, having further computer-executable instructions for computing the aggregate of the base dimension members that have a distinct property value at least in part by referencing a predefined set of instructions for computing the aggregate.

16. The computer-readable medium, according to claim 13, having further computer-executable instructions for computing the aggregates at least in part by sorting the base dimension members into subsets according to their property values.

17. A computer arrangement for analyzing data in a database, the computer arrangement configured to:

associate a selected property value of each one of a set of base dimension members with a corresponding one of the set of base dimension members;

determine a set of distinct property values for the set of base dimension members; and for each distinct property value, compute an aggregate of the base dimension members that have that distinct property value.

18. The computer arrangement, according to claim 17, further configured to compute the aggregate of the base dimension members that have a distinct property value at least in part by creating a multidimensional expression language (MDX) expression as a function of that distinct property value.

19. The computer arrangement, according to claim 17, further configured to compute the aggregate of the base dimension members that have a distinct property value at least in part by referencing a predefined set of instructions for computing the aggregate.

20. The computer arrangement, according to claim 17, further configured to compute the aggregates at least in part by sorting the base dimension members into subsets according to their property values.

* * * * *